Patented Sept. 27, 1932

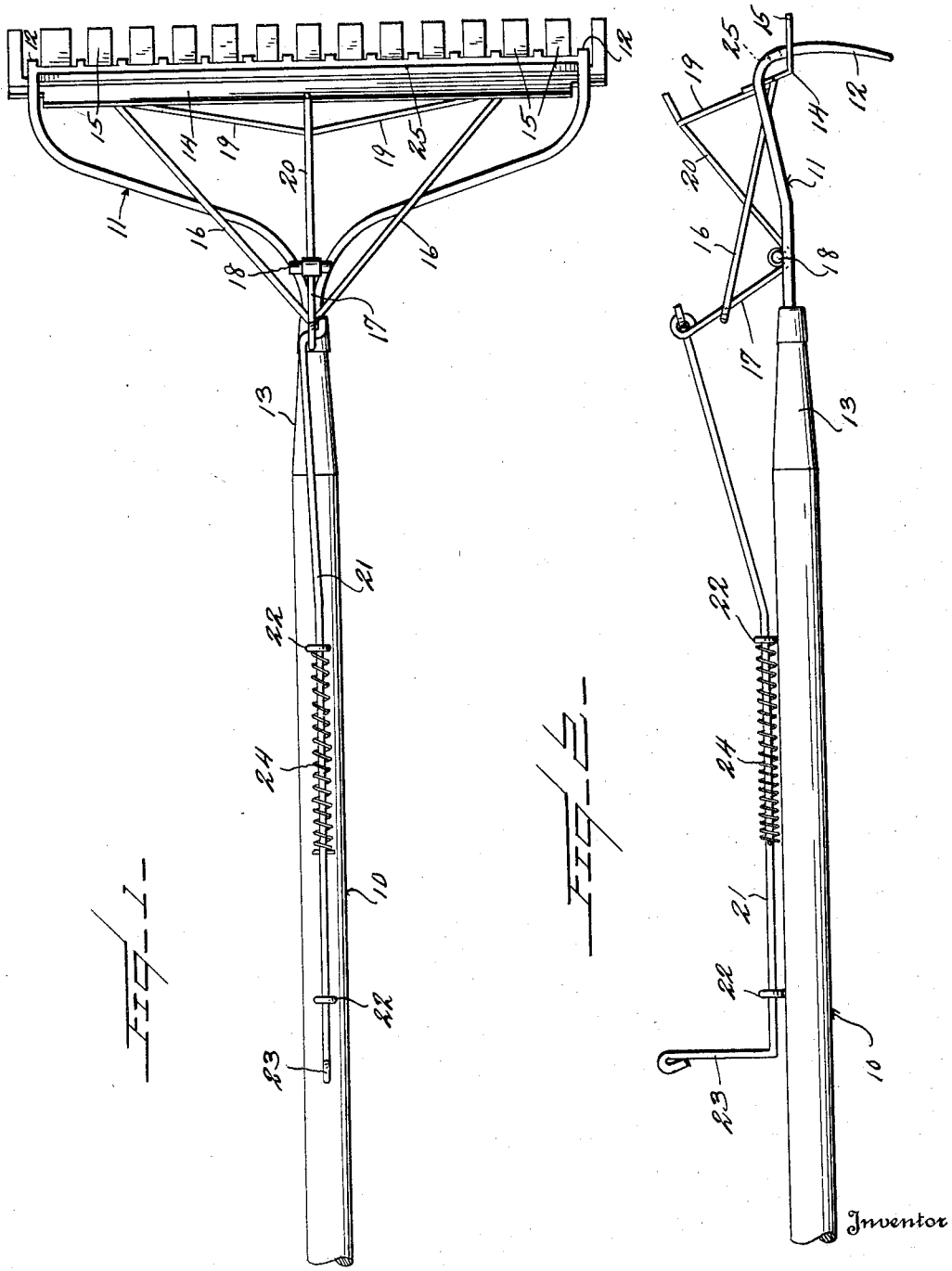

1,879,112

UNITED STATES PATENT OFFICE

HURVE L. CRESS, JR., OF HYGIENE, COLORADO

SELF-CLEANING RAKE

Application filed February 10, 1931. Serial No. 514,846.

The present invention relates to rake cleaning devices and more particularly to an attachment which may be mounted on any conventional rake structure so as to clean the tines of the rake.

An object of this invention is to provide a self-cleaning rake wherein the cleaning portion of the rake is normally held in a position where the normal use of the rake will not be interfered with, the cleaning attachment embodying means which may be operated at will so as to clean all of the tines at one operation.

The above and various other objects and advantages of this invention will in part be described in and in part be understood from the following detailed description of the present preferred embodiment, the same being illustrated in the accompanying drawing, wherein:—

Figure 1 is a detail top plan view of a device constructed according to the preferred embodiment of this invention mounted on a conventional rake structure, and Figure 2 is a detail side elevation of the device.

Referring to the drawing wherein like numerals of reference designate corresponding parts throughout the several views, the numeral 10 designates generally a rake handle structure which is provided at one end with a rake 11 having a plurality of tines 12. The rake 11 is of conventional construction and is preferably of cast construction, and a ferrule 13 is disposed about the lower end of the rake handle 10 and holds the upper end of the rake 11 on the handle 10.

In order to clean the tines 12 of the rake structure, I have provided an elongated bar 14 which extends longitudinally of the forward end of the rake 11, this bar 14 being provided with a plurality of forwardly extending teeth or tines 15 which extend between the tines 12 and slidably engage each tine so that when the bar 14 with the tines or teeth 15 is moved downwardly on the tines 12, any leaves, grass or the like will be forced off of the teeth 12.

In order to move the cleaning member 14 on the tines 12, I have provided a pair of links 16 which are attached at the forward end to the bar 14 and at the rear end secured to a rockable bar 17. The links 16 may be mounted in substantially V-shaped position and secured to the rockable link member 17 and having the forward ends thereof secured to the cleaning member 14. One end of the link or rockable member 17 is rockably mounted on a pintle 18 which is secured to the rake structure 11 rearwardly of the tines 12.

A V-shaped brace 19 is secured to the cleaning member 14 and extends upwardly therefrom. An elongated stop and brace member 20 is secured at one end to the rockable member 17 and is secured to and extends forwardly of and between the V-shaped brace 19 so that when the member 17 is rocked forwardly, the extended portion of the stop member 20 will engage the upper edge of the rake 11 so as to limit the downward swinging movement of the rock link 17 and coactively limit the movement of the cleaning member 14.

An operating member 21 is pivoted at one end to the link 17 and extends longitudinally of the handle 10 engaging in guide eyes or members 22 which are mounted on the handle 10. An operating handle 23 is mounted on the upper end of the operating member 21, and an expansible spring 24 is disposed about the operating member 21 and constantly urges the operating member 21 upwardly so as to hold the cleaning member 14 in inoperative position.

In the operation of this device, the lever 23 may be pushed forwardly or downwardly, which movement will move the operating member 21 downwardly and coactively swing the cleaning member 14 downwardly with the bearing 18 as a fulcrum, toward the free end of the tines 12 until the extended portion of the stop 20 strikes the rake 11. This movement will force any leaves, grass or other material off of the tines 12 and when the handle 23 is released, the spring 24 will urge the operating member 21 upwardly until the cleaning member strikes the crossbar 25 of the rake 11.

It will be obvious from the foregoing that a relatively simple and at the same time practical rake cleaning structure has been devised which can be readily attached to any conventional rake structure and which will not interfere with the normal use of the rake.

It is, of course, understood that various changes and modifications may be made in the details of construction and design of the above specifically described embodiment of this invention without departing from the spirit thereof, such changes and modifications being restricted only by the scope of the following claims.

I claim:—

1. In combination with a rake structure including a handle and a rake head having a plurality of spaced tines, a cleaning member slidably engaging the tines of the rake head, an operating member, connecting means connecting said operating member with said cleaning member, a V-shaped bracing member secured to the cleaning member and upstanding therefrom, and an elongated stop member secured to said bracing member and engaging said rake head upon downward movement of said cleaning member whereby to limit the movement of said operating member in one direction.

2. In combination with a rake structure, a rake cleaning member, a rockable operating member, means connecting said rockable operating member to said cleaning member, guide means carried by the rake structure and engaging the operating member whereby to slidably mount said operating member on said rake structure, an operating handle secured to said operating member, resilient means disposed about said operating member and urging said operating member into inoperative position, a V-shaped bracing member mounted on the cleaning member, and an elongated stop member extending forwardly through said V-shaped brace member and connected to said operating member whereby to limit the rocking movement of said operating member.

In testimony whereof I hereunto affix my signature.

HURVE L. CRESS, Jr.